United States Patent [19]
Wagenseil et al.

[11] 3,807,174
[45] Apr. 30, 1974

[54] HYDROSTATIC MULTIPLE DRIVE

[75] Inventors: Ludwig Wagenseil, Vohringen; Siegfried Nembach, Neu-Ulm, both of Germany

[73] Assignee: Hydromatik GmbH, Ulm/Danube, Germany

[22] Filed: Oct. 19, 1972

[21] Appl. No.: 299,111

[30] Foreign Application Priority Data
 Oct. 22, 1971 Germany.............................. 2152726

[52] U.S. Cl....................... 60/420, 60/490, 180/6.48
[51] Int. Cl............................................. F16h 39/46
[58] Field of Search........ 60/490, 19, 420, 421, 445, 60/447, 448, 449, 450; 180/6.48, 44 F

[56] References Cited
UNITED STATES PATENTS
3,477,225  11/1969  Cryder et al...................... 60/447 X
3,672,161   6/1972  Krusche et al........................... 60/19

*Primary Examiner*—Edgar W. Geoghegan
*Attorney, Agent, or Firm*—Owen, Wickersham & Erickson

[57] ABSTRACT

A hydrostatic multiple drive has two or more hydrostatic pump-motor transmissions associated for operation by a hydraulic control. The hydrostatic pumps of the transmissions are driven at a fixed transmission input speed in relationship to one another, and each transmission has at least one hydraulic servomotor with a pressure control chamber for varying displacement to change the motor output speed of the transmission. The hydraulic control includes a common control line which extends between a source of pressure and drain and which is connected in parallel branches to the pressure control chambers of the hydraulic servomotors. Each parallel branch has a fixed throttle located between the source of pressure and the pressure control chamber of the servomotor and an adjustable throttle located between the pressure control chamber of the servomotor and drain. Adjustable pressure override means are associated with the common control line to maintain proportionality of adjustment of the individual transmissions on reduction of pressure when an override occurs.

15 Claims, 4 Drawing Figures

HYDROSTATIC MULTIPLE DRIVE

BACKGROUND OF THE INVENTION

The invention relates to a hydrostatic multiple drive consisting of two or more individual hydrostatic transmissions, each comprising a hydropump which is driven by a common drive motor or a separate motor which is at a fixed rotary speed ratio to the motors of the other pumps, and a hydromotor in which the hydropumps and/or hydromotors are adjusted by means of a variable control pressure through servomotors with an upstream control element, the desired control pressure supplied by an auxiliary pump being adjusted by means of a separate pressure transmitter for each individual transmission consisting of pump and motor.

Such hydraulic multiple drives are preferably used in the case of cross-country vehicles, such as chain or caterpillar track mounted vehicles, or for example as a drive for the rolls of the individual roll stands in a rolling train. Such drives are therefore used wherever a matched performance of individual transmission is required. Such multiple drives are intended to allow infinitely variable adjustment of the transmission ratio of the individual transmissions for the greatest possible step-up or step-down range and, when used on motor vehicles, to guarantee optimum steering and travelling conditions on the straight and also on bends, and to achieve maximum possible efficiency from the performance of the drive motor for the pumps of the individual hydrostatic transmissions, without overloading it. This means that once they are adjusted, step-up and step-down ratios of the individual transmissions to one another must not vary when external influences arise such as differing loadings on the individual transmissions, or when overload-preventive adjustments of the entire multiple drive or of the individual transmissions are necessitated by overloading of the drive motor or motors of the individual transmissions or overloading of one single transmission.

In the case of a multiple drive for vehicles, it is known (German Patent No 1,750,554), to couple the pump adjusting arrangements of the pumps of the individual transmissions through a linkage which is operated by a servomotor, in order to adjust the speeds of the individual transmissions to the same value. For the steering (different speed of the individual transmissions), this adjustment is, individually for each pump, overridden by a positioning piston associated additionally with each pump, through further additional servomotors. Under overload, the pumps are pivoted back evently through the linkage. The maintenance of proportionality of the pump adjustment to one another required for even negotiation of a bend is achieved by additional mechanical means.

With such an arrangement, there is no self-contained hydraulic control system which satisfies all the aforesaid conditions, for a plurality of individual transmissions in a multiple drive; instead, there are two individual single transmissions which are coupled mechanically to each other by complicated linkage. Also, it is only with great difficulty and at considerable expense that this control system can be constructed for more than two individual transmissions in a multiple drive and for additional controlled variables to be fed in through them.

Also known is a positioning arrangement for an infinitely variable hydrostatic transmission (German Patent 2,001,701), in which the adjusting movement is generated by a servomotor in which the position of the positioning element which is displaceable against the force of a spring is controlled by a controlling element which is connected to a control piston which is displaceable on a controlling cylinder and which is stressed by a control pressure which is arbitrarily adjustable by means of a control pressure regulator. Connected to the control pressure line between control pressure regulator and control cylinder there is a drain valve controlled according to a rotary speed, while in the control pressure line between the control pressure regulator and the point of connection to the line carrying the drain valve, there is a throttle point. In the case of provision of such a positioning arrangement for a plurality of hydrostatic transmissions forming a multiple drive, it is further proposed that in each case the drain valves of the two individual hydrostatic transmissions be jointly controlled by a rotary speed measuring element. The object of this is that in terms of percentage, both control pressure lines are always relieved to the same degree, i.e. when the drain valve is opened, which corresponds to response of a limit load control system, so that the preset rotary speed conditions relative to the individual hydrostatic transmissions to one another are not altered.

This coupling of the control elements (drain valves) of the individual hydrostatic transmissions is complicated, since in rodrr to maintain proportionality of adjustment of the individual transmissions, care must be taken to ensure very accurate structurally identical construction of the controlling means (drain valves). With the known positioning arrangement, also, it is not possible when applying such a multiple drive to a vehicle, to isolate the steering (change in the rotary speed ratios of the individual transmissions) from the speed adjustment (change in the rotary speeds of the individual transmissions while retaining the same rotary speed relationship to one another), in order to achieve "car like" vehicle operation. Moreover, the use of the known positioning arrangement both for more than two individual transmissions and also for an overload protection, which is dependent not only upon the rotary speed, is difficult, particularly if the factors which secure the overload protection are dependent for example on the maximum pressure in the working circuits of the individual transmissions.

The invention is based on the problem of avoiding the aforesaid disadvantages of the positioning arrangement mentioned for hydrostatic multiple drives and of providing a drive in which in a simple manner, in addition to the independent and individual control or adjustment of the individual transmissions to desired output rotary speeds where the entire multiple drive is regulated as a function of parameters, such as overloading of individual transmissions, driving engine for the pumps of the individual transmissions and the like, the proportionality of the adjustment of the individual transmissions is always retained.

SUMMARY OF THE INVENTION

In order to resolve this problem, in the case of a hydrostatic multiple drive of the type mentioned at the outset, it is suggested that between the auxiliary pump and the positioning element of the hydropump and/or hydromotor of each individual transmission, there be provided a fixed throttle, and between each positioning element and the pressureless discharge or container for the controlling fluid, an adjustable throttle be provided as a pressure transmitter, whereby, to a common control line between auxiliary pump and the fixed throttles, there are connected at least one externally adjustable control element for adjusting the control pressure in the control line and/or at least one regulating element, the two being connected in parallel. This construction permits of individual adjustment of each individual hydrostatic transmission and guarantees that control and regulating operations dependent upon parameters such as rotary speeds, working pressure and the like have identically the same effect for all individual hydrostatic transmissions, since they are fed in through the common control line for all individual transmissions. This has the advantage that for each parameter which is to be fed in, for example rotary speed or a definite working pressure, only one single regulating means need be provided in the entire control line, so that inaccuracies in the proportionality of the adjustment of the individual transmissons due to differing structural design of the plurality of regulating means otherwise required are excluded. This does not mean that a plurality of parameters cannot act even on only a single regulating means, for example one drain valve, the balancing of the parameters with respect to their priority, being undertaken by simple structural measures at the drain valve.

In a suitable further development of the invention, the externally adjustable control means is an arbitrarily adjustable pressure limiting valve. This offers two possibilities. Either the pressure limiting valve is adjusted to a fixed value which indicates the maximum pressure in the common control line, or the infinitely variable adjustment of the pressure limiting valve is used for controlling the entire multiple drive, if the driving motor for the pumps of the individual transmissions is maintained unaltered at a favorable drive speed.

In order to achieve the above-mentioned advantages, it is expedient for the regulating means to be a drain valve which is influenced by the rotary speed of the common driving motor or the working pressures of the individual transmissions.

In order to compensate for the initial tension of the spring in the positioning element, which is frequently preferred in the zero position of the individual hydropumps, the adjusting throttles according to the invention are so constructed that downstream of the throttle point there is a pressure valve through which the outflowing fluid can only be carried away when the throttle is not in the fully opened state. The setting of this pressure valve corresponds to the initial tension of the spring in the positioning element, so that if the adjusting throttles in the control line are not fully opened, a control pressure is always maintained which compensates for the initial tension of the spring in the positioning elements.

In order to increase the range of adjustment for the transmission ratio of individual hydrostatic transmissions, it is known not only to construct the pumps to be adjustable, but also to adjust the hydromotors. Applied to the present invention, the positioning elements of the hydromotors of the individual transmissions can for this purpose be connected to a common motor control line for common equi-directional adjustment, or in another construction, all hydromotors of the individual transmissions may be associated with a common positioning element which is fed through a motor control line which is coupled to a linkage to the servomotors of the indiviual hydromotors, for common equidirectional adjustment.

Taking into account this possibility of adjusting the hydromotors, a further and expedient development of the invention is for the common motor control line to be so connected through change valves to the control lines of the hydropumps, between fixed throttle and adjustable throttle, that it is at all times the highest of the pump control pressures obtaining in the control lines of the hydropumps which is applied to the motor control line. Consequently, the hydromotors are adjusted as a function of the most heavily loaded of the individual transmissions. The proportionality of the rotary speed ratios of the individual transmissions is not altered thereby; instead, care is taken to ensure that the power of the driving motor is utilized to the greatest possible extent.

Another construction according to the invention is for the common control line to be branched into one pump control line for the hydropumps and the common motor control line and for there to be provided both in the pump control line and also in the motor control line a pressure limiting valve which is adjusted to different pressures, the control and/or regulating means being so connected through non-return valves to the pump control or motor control lines that they are connected to whichever control line is at the time carrying the higher control pressure. With this construction, the motors are adjusted not in matched dependency upon the adjustment of the hydropumps, but only when the control pressure in the pump control line has reached its maximum.

In a further development of the invention, in the case of individual reversible transmissions, a multiway valve is located between the fixed throttles of the hydropump of each transmission and the associated adjusting throttles for each direction of rotation of the transmission, in order to switch over the relationship of the fixed throttles to the adjustable throttles. In this case, the adjustable throttles act in the opposite direction, the multiway valves of the individual transmissions being coupled to one another and the oppositely operating adjustable throttles of each individual transmission being adjustable by means of a common operation successively and alternately with correspondingly oppositely operating adjustable throttles of another individual transmission. This construction permits of separation in the adjustment of the direction of rotation of the individual transmissions of the multiple drive and the adjustment of the rotary speed relationship of the individual transmissions to one another. In the case of application to a vehicle, therefore, a "car like" mode of travel is possible. A fixed steering radius is associated with each setting of the oppositely functioning adjustable throttles. The adjustment of the travelling speed is made by controlling the control fluid pressure in the common pump and motor control lines.

Examples of embodiment of the invention are explained in greater detail hereinafter with reference to the attached drawings. In order to simplify the description, all elements such as working pressure line, multiway slide valves, pressure limiting valve, etc., which are not required to explain the invention have been omitted.

Also, throughout the various forms of embodiment, recurring elements which in their construction or mode of action correspond to the form of embodiment initially explained, are not explained again. They are identified by the same reference numerals.

Other objects, advantages and features of our invention will become apparent from the following detailed description of one preferred embodiment taken with the accompanying drawings.

Figure 1:
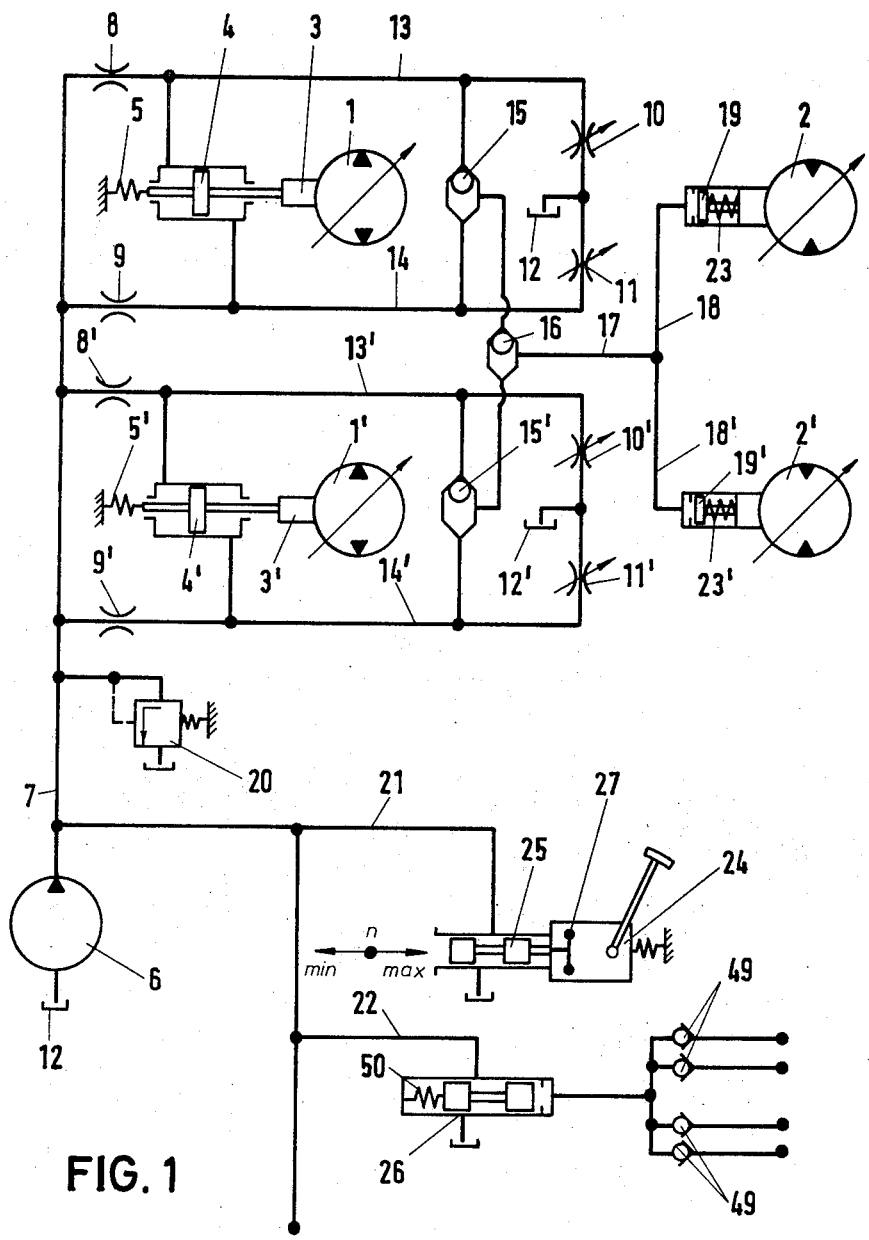
FIG. 1 is a diagrammatic view of the invention with the hydraulically coupled positioning elements of the servomotors of the hydromotors adjustable according to whichever is the highest pump control pressure at the time.
Figure 2:
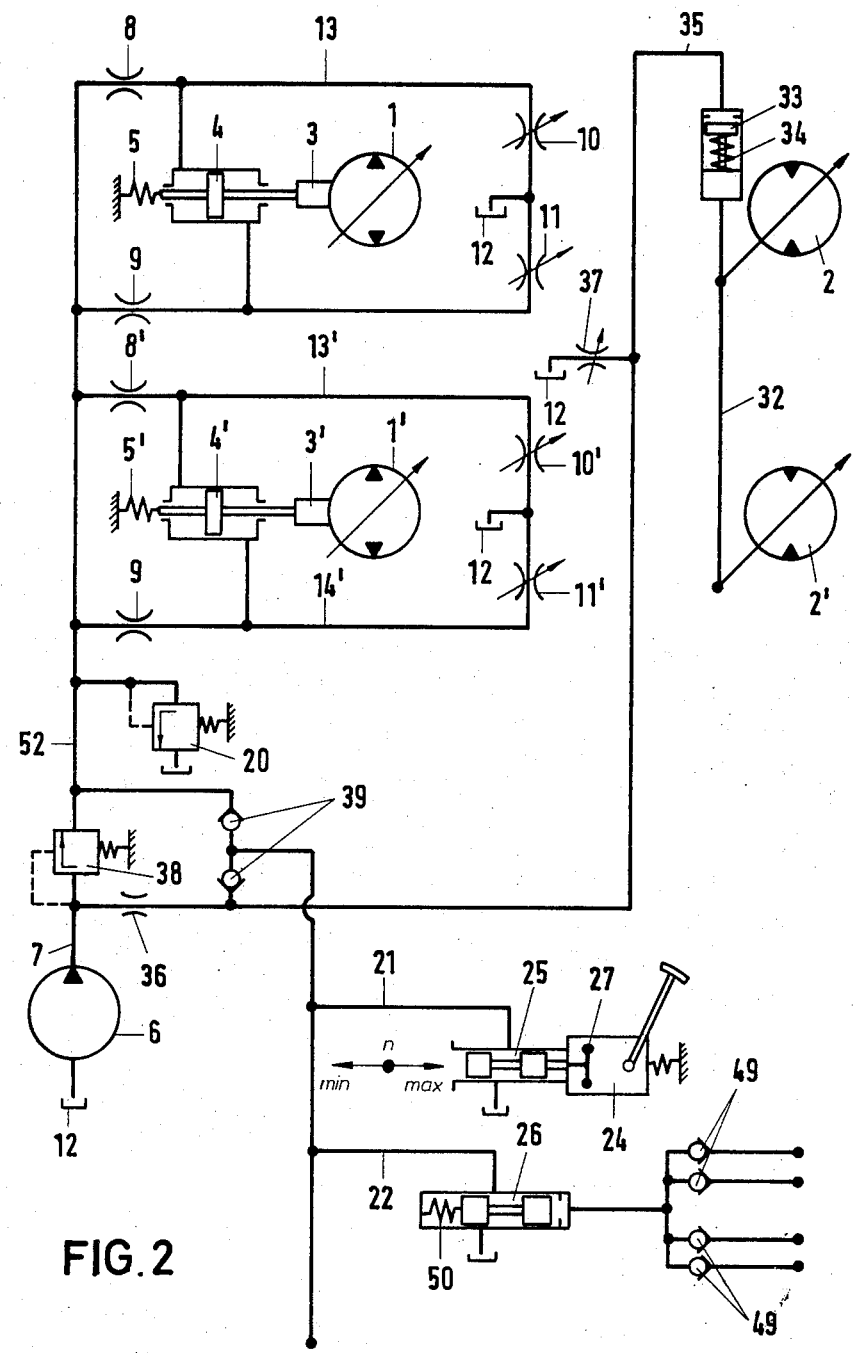
FIG. 2 is a diagrammatic view of the invention with the common positioning element associated with the hydromotors of the individual transmissions adjustable independently of the pump control pressure.

According to FIG. 1, through working lines not shown, the pumps 1, 1' which are jointly driven by an internal combustion engine, not shown, drive the motors 2, 2' which similarly drive consumer units, not shown — in the case of the multiple drive to a chain or caterpillar track mounted vehicle, these consumer units are the individual chains of the vehicle. In each case pump 1 and motor 2 or pump 1' and motor 2' constitute the individual transmissions of the multiple drive which are adjustable independently of one antoher in their transmission ratio, i.e. the output speed of the motors 2, 2'. Associated with each pump 1, 1' and intended to serve as an adjusting arrangement, there is a servomotor 3, 3' which, as a positioning element, is influenced by a bilaterally operable positioning piston 4, 4' which is biased by a spring 5, 5'. According to the direction in which the pumps 1, 1' are pivoted, and thus the direction of rotation of the individual transmissions, a control line 7 fed with control fluid by an auxiliary pump 6, acts in each case on one side of the positioning pistons 4, 4' through fixed parallel connected throttles 8 or 9 or 8' or 9'. After the throttles 8, 9 and 8', 9' in control lines 13, 14 and 13', 14', the control line 7 continues into externally adjustable throttles 10, 11 and 10', 11' which serve as pressure transmitters for the lines 13, 14 and 13', 14' and thus for the positioning elements, these adjustable throttles communicating with the discharge of control fluid or containers 12, 12'. Located between the two control lines 13, 14 and 13', 14' are change valves 15, 15' between which there is a change valve 16 which applies positioning fluid through motor control lines 17 and 18, 18', to operate the pistons 19, 19' of positioning elements of adjusting arrangements associated with the motors 2, 2', against the force of the springs 23, 23'. As an adjusting arrangement, for the motors 2, 2', it is possible to provide a common positioning element as shown in FIG. 2, which, through a linkage 32, jointly adjusts the (not shown) servomotors for adjusting the motors.

Connected through a line 21 to the control line 7 which is secured by a control pressure limiting valve 20, there is a drain valve 25 acted upon by a centrifugal governor 27 which communicates with the (not shown) internal combustion engine for driving the pumps 1, 1', so that it acts as a limit load regulating valve for the multiple drive. The regulator 24 adjusts the rotary speed of the internal combustion engine which drives the pumps 1, 1'. Connected parallel with the drain valve 25, through a line 22, there is a further regulating means which is constructed as a drainvalve 26, for lowering the control pressure in the control line 7. The drain valve 26 is connected through non-return valves 49 to the working pressure lines of the individual transmissions, so that in each case the highest working pressure corresponding to the construction of the spring 50 of the valve 26, starts to open the valve 26 with effect from a predetermined working pressure in the circuit of an individual transmission. Naturally, it is also possible to connect a plurality of transissions and/or a plurality of control and/or regulating elements which affect the control pressure, to the control line 7 in the previously described manner.

Figure 3:
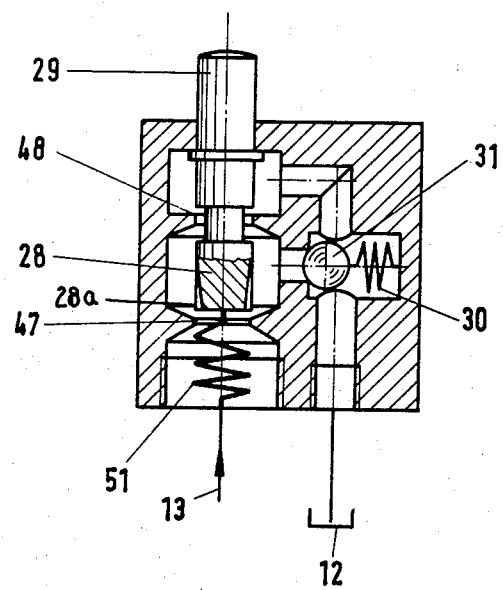
FIG. 3 is an expedient further development of one of the adjustable throttles shown diagrammatically in FIGS. 1, 2 and 4.

In the inoperative position of the drive, the pumps 1, 1' are initially set for nil delivery, i.e. when axial piston pumps are used, they are not pivoted out (the pump pistons do not displace fluid), but the motors 2, 2' are in contrast set for maximum absorption volume, i.e, if axial piston motors are used, they are fully pivoted out by the springs 23, 23'. Thus, the individual transmissions have the minimum transmission ratio. The zero setting of the pumps 1, 1' is guaranteed by the springs 5, 5' which can in themselves be without tension in this pump position, and be stressed by traction or compression only when the pumps are adjusted. Yet it is suitable to stabilize the zero position by somewhat initially tensing the springs 5, 5'. This initial tension must however be compensated in order to compensate for falsifications of the adjustment characteristic. A construction of adjustable throttle which takes this initial tension into account and which can be used as an adjustable throttle 10, 11 or 10', 11', is shown in section in FIG. 3. A spring 51 raises a throttle member 28 (when the throttle is not actuated), which is connected to a throttle pin 29, off its seat 47, so that control fluid can flow out freely over the control edge 48. When the throttle is operated by displacement of the throttle pin 29, then first the control edge 48 is closed so that the control fluid supplied through the line 13 has to overcome the resistnace of the spring 30 of the pressure valve 31. The pressure needed for this is so calculated that, in retroaction on the control piston 4, it compensates for the initial tension force of the spring 5. The throttling action is achieved by moving the throttle member 28 downward in the seat 48 so that the tapered grooves 28a on the sides of the throttle 28 increasingly restrict the flow of fluid in the direction indicated by the arrow 13. The adjustable throttles 10, 11, 10', 11' are all constructed in the same way. They can expediently be so disposed in known manner that they can be operated in any desired combination by means of a control column which acts on the throttle pins 29, particularly when the multiple drive is used as a vehicle drive.

The multiple drive explained operates as follows: first, the internal combustion engine, not shown, drives the pumps 1, 1' and 6 at the rotary speed adjusted at the regulator 24. The control fluid passed by the auxiliary pump 6, through the line 7 and the throttles 8, 9 and 8', 9', acts equally on both sides of the positioning pistons 4, 4' and flows through the lines 13, 14 and 13', 14' and the fully opened adjustable throttles 10, 11 and 10', 11' to the outlet, i.e. container 12, 12'.

For the same rotary speed ratio of the individual transmissions (ratio of output speeds at the motors 2, 2') or equal speed - corresponds when applied to vehicle in straight-ahead travel — the throttles 10, 10' for one direction of rotation or 11, or 11' for the other direction of rotation are simultaneously and increasingly closed, so that an increasing pressure builds up in the control lines 13, 13' and 14, 14', which is applied to the control pistons 4, 4' of the positioning elements in the same way from left and from right respectively, adjusting both pumps 1, 1' simultaneously and evenly, so driving the mtors 2, 2' with the same speed ratio. The highest of the control pressures obtaining in the pump control lines 13, 13' and 14, 14' is balanced by the change valves 15, 15' and 16 and applied through the lines 17 and 18, 18' to the pistons 19, 19' of the motor positioning elements, setting back both motors at the same time and to the same extent against the force of the springs 23, 23' to thereby reduce the displacement of said motors. By appropriately matching the characteristics of the springs 5, 5' and 23, 23' to one another, the adjustment characteristics of the pumps and motors can be adjusted to one another at will, so that any desired characteristic can be obtained, i.e. with respect to the optimum utilization of the driving power of the internal combustion engine. The always common motor adjustment has no effect on the preset direction of rotation of the individual transmissions. It widens the adjustable range of transmissions of the individual transmission systems, the greatest transmission of which is attained when the pumps are adjusted to their greatest delivery rate and the motors are adjusted to their minimum absorption volume.

When the internal combustion engine is overloaded, its speed drops below the value adjusted at the regulator 24, so that the centrifugal governor 27 opens the drain valve 25 causing the pressure in the control line 7 to drop. In consequence, all the pressures obtaining in the pump control lines 13, 14 and 13', 14' are reduced at the same time and, due to the action of the throttles 8, 9 and 8', 9' proportionally to one another, so that the pumps are simultaneously and proportionally adjusted to a lower rate of delivery, so that the preset speed ratio and direction of rotation are not affected. A pressure drop in the control line 7, occasioned for example by the regulating means 26 as a function of a preset maximum working pressure in the circuit of one of the individual transmissions, acts in the same way.

A variation in the speed ratio of the individual transmissions — steering when applied to vehicles — is achieved by differing adjustment of the pumps 1, 1', in that the adjustable throttles 10, 10' and 11, 11' are closed to varying extents. In an extreme case for example the throttles 10, 11' are opened and the throttles 11, 10' are closed, so that the individual transmissions run in opposite directions with the maximum transmission ratio. When applied to the steering of a vehicle, the vehicle would turn on the spot about its vertical central axis.

In such an operating condition of the multiple drive, if for example the internal combustion engine or one of the individual transmissions were to be overloaded, then the control prssure in the control line 7 would be reduced by the drain valves 25 (in the case of an engine overload) or 26 (in the case of an individual transmission being overloaded) and the proportionality of the adjustment of the individual transmissions to one another is still retained. The adjusted speed ratio — for applications to a vehicle, this equals the adjusted curved path — remains exactly maintained.

In the case of the form of embodiment shown in FIG. 2, there is associated with the pumps 1, 1' and the motors 2, 2' in each case a separate control line, a pump control line 52 and a motor control line 35. A common adjusting arrangement with a positioning element, consisting of piston 33 and, to bias this, a sprin 34, is associated with the motors 2, 2' which are coupled mechanically by a linkage 32, but also in this form of embodiment, the hydraulic motor coupling described with reference to FIG. 1 may be used. The piston 33 is subject to the action of control fluid through a motor control line 35 which branches from the control line 7 through a throttle 36. By virtue of a pretensing valve 38, it is possible to supply the pump control line 52 and the motor control line 35 from a single auxiliary pump 6 or auxiliary pressure source, the construction of the adjusting means of the pumps (determined by the springs 5, 5') in relation to the adjusting arrangement or the adjusting arrangement of the motors (determined by the spring 34) is such that a higher control pressure is used in the motor control line 35 than in the pump control line 52. The pretensing valve 38 is adjusted to the pressure valve which is above the pressure value adjusted by the pump control pressure limiting valve 20, so that the supply of control fluid to the pump control line 52 occurs only when the control pressure set at the pretensing valve 38 is exceeded. The pretensing valve 38 acts thereby according to the limiting valve 20 of the pump control line 52 as a motor control pressure limiting valve for the motor control line. The non-return valves 39 ensure that the regulating means 25, 26 described with reference to FIG. 1 and influencing the control pressure are always connected to the higher control pressure, so that in the event of overloading, i.e. in the event of the regulating means responding, first the motors are adjusted and then the pumps are restored. An adjustable throttle 37 connected to the motor control line 35 makes it possible additionally and arbitrarily to influence the motor adjustments in order to make the drive still more flexible, i.e. when the throttle 37 is fully opened, the two adjustable motors 2, 2' act as constant, non-variable motors.

Figure 4:
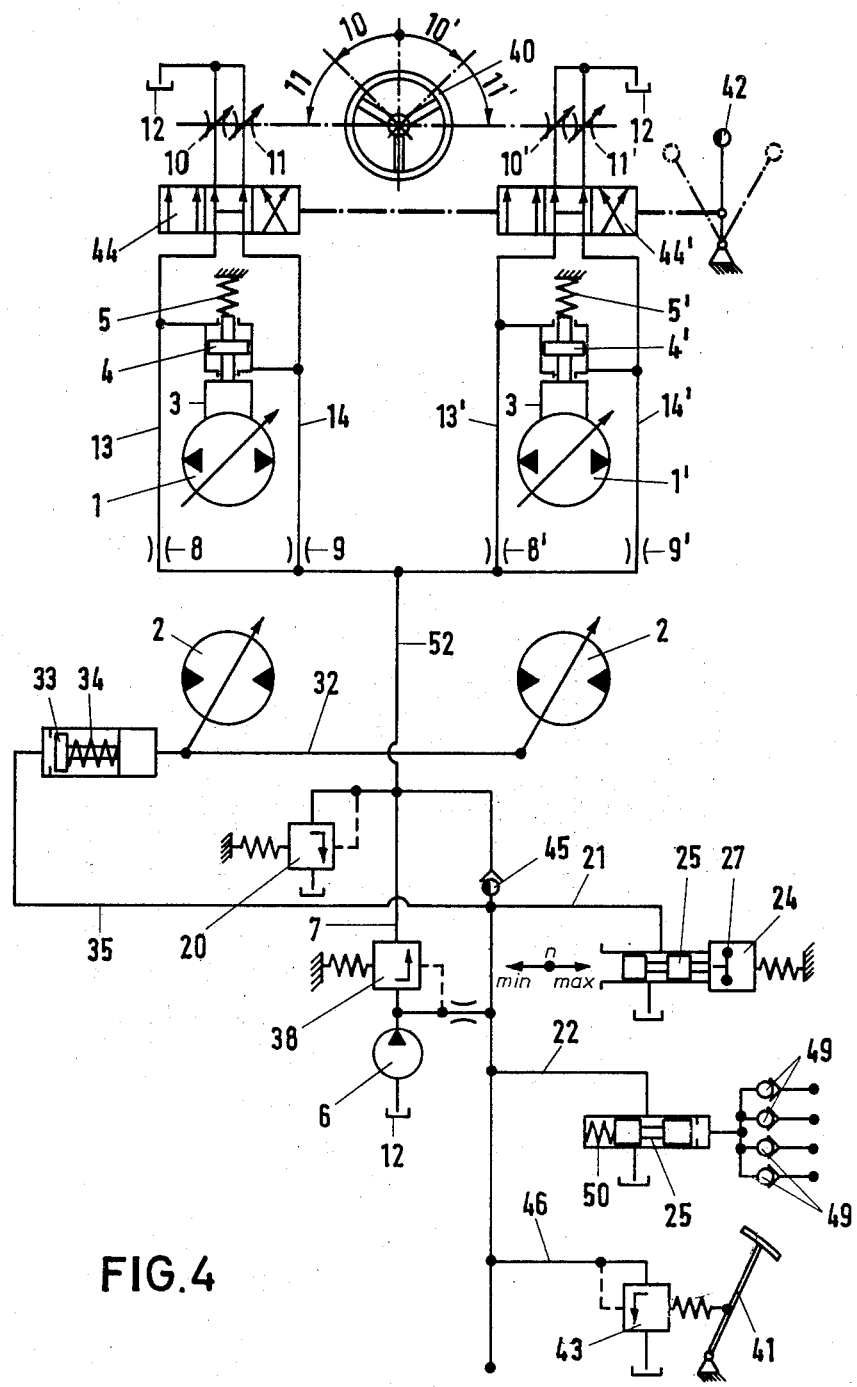
FIG. 4 is a diagrammatic view of the invention with separate adjustment of the direction of rotation of the individual transmissions and possibility of coupled adjustment of the rotary speed ratios of the individual transmissions.

FIG. 4 illustrates the invention in a case where, with the multiple drive applied to a vehicle drive, the vehicle can be driven in a car like fashion, the direction being adjusted by a steering wheel 40, the speed with a driving lever 41 and the direction of travel (forwards or reverse) can be adjusted by a direction of travel selector 42, all independently of one another. The arrangement operates as follows:

The internal combustion engine not shown drives the pump 1, 1' and the control pump 6, which feeds control fluid into the control line 7. In this case, the pumps 1, 1' are first set for minimum delivery rate but the motors 2, 2' on the other hand are adjusted to maximum absorption volume. So long as the internal combustion engine is idling, the drain valve 25 connected to the centrifugal governor 27 is opened, so that the control fluid can flow out through the line 21 as well as through the line 46 and the similarly opened running valve 43. As soon as the working speed of the internal combustion engine has been adjusted, the drain valve 25 closes. After the direction of travel has been selected by means of the direction of travel selector 42, which operates the multiway valves 44, 44', the vehicle is ready to move.

In the case of straight-ahead travel — same transmission ratio of the individual transmissions or same rotary speed of the engines 2, 2' — the running valve 43 is increasingly closed by means of the lever 41, so that a growing control pressure builds up in the control line 7, being limited for the pump control line 52 by the control pressure limiting valve 20 and, as described in connection with FIG. 2, upon further increase of the control pressure following the pump adjustment, the motors 2, 2' are adjusted through the motor control line 35, the pretensing valve 38, when the non-return valve 45 is closed, determining the minimum level of motor control pressure in the line 35. If the throttles 10, 10' are closed and the throttles 11, 11' are opened, then a pump control pressure which rises with increasing control pressure builds up in the lines 13, 13', so that by virtue of the operation of the lever 41, the pumps 1, 1' are increasingly adjusted to greater delivery and the vehicle starts to move in the preselected direction. If the pumps 1, 1' are adjusted to maximum delivery and if the valve 43 is further closed, i.e. the control pressure continues to rise, then the speed of the vehicle is further increased by adjustment of the motors 2, 2' to a lesser absorption capacity and thus a higher speed.

When negotiating a bend, for example, the steering wheel 40 is turned rightwards. When this happens, first the throttle 10' is opened so that the pump 1' is set back, since the throttle 11' remains open. A lost motion linkage between the steering wheel 40 and the throttles 11', 10 and 11 permits throttle 10' to be opened as the steering wheel 40 is turned through the sector 10' without effecting any change on the settings of the throttles 11', 10 and 11. Thus, the drive on one side of the vehicle is driven more slowly than the other, so that the vehicle describes a curve and finally, when the pump 1' is in the zero position, it turns on the right track. If the steering wheel 40 is rotated beyond the range 10' into the range 11', then the throttle 11' becomes increasingly closed, so that the pump 1' is adjusted beyond the zero position into the opposite direction of rotation. In consequence of this, the right-hand track runs backwards and the vehicle, with full reverse adjustment of the pump 1', turns on the spot about its vertical central axis. Under all steering conditions, the vehicle speed can be altered simultaneously or by itself without influencing the radii of the curves, since any influencing of the control pressure acts proportionally on the pump settings, as described with regard to FIG. 1. It is also possible to preselect the radius of a curve exactly, since a fixed relationship exists between steering wheel deflection and curve radius. Furthermore, even in reverse travel, the direction of the steering wheel deflection corresponds to the direction of travel. Here, too, the overload safeguard operates in the manner already described in that the control pressure is varied by the drain valves 25, 26 which act as a regulating means.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A control for a hydrostatic multiple drive of the kind in which a hydrostatic pump-motor transmission is associated with at least one other hydrostatic pump-motor transmission, the pumps are driven at a fixed transmission input speed relationship to one another, and each transmission has at least one hydraulic servomotor with a pressure control chamber for varying displacement to change the motor output speed of that transmission, said control comprising,
   a common control line extending between a source of pressure and drain and connected in parallel branches to the pressure control chambers of the hydraulic servomotors,
   a fixed throttle in each parallel branch for each transmission and located between the source of pressure and the pressure control chamber of the servomotor,
   an adjustable throttle in each parallel branch and located between the pressure control chamber of the servomotor and drain, and
   adjustable pressure override means associated with the common control line to maintain proportionality of adjustment of the individual transmissions on reduction of pressure when an override occurs.

2. A control as defined in claim 1 wherein the adjustable pressure override means is an adjustable pressure limiting valve.

3. A control as defined in claim 1 wherein the adjustable pressure override means include a drain valve and positioning means for positioning the drain valve in response to the speed at which the pumps are driven.

4. The control as defined in claim 1 wherein the adjustable pressure override means include a drain valve and positioning means for positioning the drain valve in response to the highest working pressure in an individual transmission.

5. A control as defined in claim 1 wherein each adjustable throttle includes a pressure limiting valve on the downstream side of the throttle point and loading means for holding the pressure limiting valve closed until the throttle is at least partly closed to compensate for any preload on the hydraulic servomotors.

6. A control as defined in claim 1 wherein each transmission motor has a hydraulic servomotor with a pressure control chamber for varying the displacement of the motor and wherein the control includes a common motor control line connected to the pressure control chambers for common and equidirectional adjustment of the transmission motors.

7. A control as defined in claim 1 wherein one servomotor is linked to all transmission motors to vary the displacement of each motor in the same direction and to the same extent and wherein the control includes a motor control line extending between a source of pressure and drain and connected to the pressure control chamber of the servomotor, a fixed throttle in said motor control line located between the source of pressure and the pressure control chamber, and an adjustable throttle in said motor control line and located between the pressure control chamber of the servomotor and drain.

8. A control as defined in claim 1 wherein both the transmission pumps and the transmission motors have servomotors with pressure control chambers for varying the displacements of the pumps and the displacements of the motors, said common control line includes a pump control line with said parallel branches connected to the pressure control chambers of the pump servomotors and a motor control line connected to the pressure control chamber of the motor servomotor, and wherein the control includes change valve means connected to said parallel branches of the pump control line and to the motor control line to supply to the motor control line only the highest pressure present in said parallel branches of the pump control line.

9. A control as defined in claim 1 wherein the common control line has a common pump control line and a common motor control line and the control includes a pressure limiting valve in the common pump control line, a pressure limiting valve in the common motor control line, and a non-return valve means connecting the adjustable pressure override means to whichever of the common pump control line and common motor control line is at the time carrying the higher control pressure.

10. A control as defined in claim 1 wherein the individual transmissions are reversible by changing the direction of rotation of the hydrostatic pumps, said parallel branches comprise a pair of parallel branches for each hydrostatic pump servomotor, and wherein the control includes multiway valve means located between the fixed throttles and the adjustable throttles for reversing the relationship of each fixed throttle to each adjustable throttle in each pair of parallel branches in each transmission to reverse the direction of rotation of each hydrostatic pump on actuation of the multiway valve, and multiway valve connecting means interconnecting the multiway valves of the individual transmission to cause all of the multiway valves to act in unison.

11. A control as defined in claim 1 wherein the individual transmissions are reversible by changing the direction of rotation of the hydrostatic pumps, said parallel branches comprise a pair of parallel branches for each hydrostatic pump servomotor and wherein the control includes direction control means connected to each pair of adjustable throttles in each pair of parallel branches for successively and alternately adjusting the adjustable throttles in each pair of parallel branches in each transmission and for producing correspondingly opposite operating adjustments of the pair of adjustable throttles in another transmission.

12. A control as defined in claim 1 wherein the hydraulic servomotors vary the displacements of the transmission pumps and wherein the parallel branches are connected to the pressure control chambers of the pump hydraulic servomotors.

13. A control as defined in claim 12 wherein the hydrostatic motors also have a hydraulic servomotor for varying the displacement of the motors and wherein the common control line includes a motor control line connected to the servomotor for the hydrostatic motors.

14. A control as defined in claim 1 wherein the servomotors are associated with the hydrostatic motors to vary the displacements of the hydrostatic motors.

15. A control as defined in claim 1 wherein the adjustable pressure override means include an adjustable pressure limiting valve, drain valve means and positioning means for positioning the drain valve means in response to the speed at which the pumps are driven and in response to the highest working pressure in an individual transmission.

* * * * *